US006802182B2

(12) United States Patent
Bigo et al.

(10) Patent No.: US 6,802,182 B2
(45) Date of Patent: Oct. 12, 2004

(54) TAPPING CIRCUIT INCLUDING A TAPPING VALVE FOR REPLENISHING AND/OR FLUSHING THE CASING OF A HYDRAULIC MOTOR

(75) Inventors: Louis Bigo, Compiegne (FR); Jean-Claude Case, Bonneuil en Valois (FR); Jacques Fontaine, Verberie (FR); Jean-Pierre Lebrun, Monceaux (FR); Gilles Lemaire, Margny (FR); Gilbert Mahe, Senlis (FR); Alain Mangano, Vieux Moulin (FR); Jean-Nöel Pogneau, Creil (FR); Jean-Philippe Raisin, Crepy en Valois (FR); Vincent Siquier, Burlington, WI (US); Patrick Wasielewski, Senlis (FR)

(73) Assignee: Poclain Hydraulics Industrie, Verberie (FR)

( * ) Notice: Subject to any disclaimer, the term of this patent is extended or adjusted under 35 U.S.C. 154(b) by 51 days.

(21) Appl. No.: 10/034,531

(22) Filed: Dec. 28, 2001

(65) Prior Publication Data

US 2002/0083705 A1 Jul. 4, 2002

(30) Foreign Application Priority Data

Dec. 28, 2000 (FR) ............................................ 00 17170

(51) Int. Cl.[7] ................................................ F16D 31/02
(52) U.S. Cl. ......................................................... 60/464
(58) Field of Search .......................... 60/464, 450, 451

(56) References Cited

U.S. PATENT DOCUMENTS

| | | | | | |
|---|---|---|---|---|---|
| 3,561,214 | A | | 2/1971 | Bobst | |
| 4,332,134 | A | * | 6/1982 | Cochran et al. | 60/464 |
| 4,759,261 | A | | 7/1988 | Flieter | |
| 5,356,347 | A | * | 10/1994 | Komura et al. | 474/28 |
| 6,430,923 | B1 | * | 8/2002 | Meier | 60/464 |
| 6,508,059 | B1 | * | 1/2003 | Takada et al. | 60/464 |

FOREIGN PATENT DOCUMENTS

| | | |
|---|---|---|
| DE | 3926354 | 2/1991 |
| DE | 19733911 | 7/1998 |

* cited by examiner

*Primary Examiner*—F. Daniel Lopez
(74) *Attorney, Agent, or Firm*—Ladas & Parry

(57) ABSTRACT

The tapping circuit forms part of a main fluid circuit which comprises a hydraulic motor having a preferred operating direction and at least two main pipes suitable for communicating with the cylinder block of the motor and constituting respectively, in said preferred operating direction, a feed main pipe and a discharge main pipe. The tapping circuit comprises a single tapping and removal valve connected continuously via a tapping pipe to that one of said main pipes which, in the preferred direction, serves for discharge purposes. This valve serves to replenish the fluid so as to cool it and/or to flush the internal space of the casing of the motor.

25 Claims, 4 Drawing Sheets

TAPPING CIRCUIT INCLUDING A TAPPING VALVE FOR REPLENISHING AND/OR FLUSHING THE CASING OF A HYDRAULIC MOTOR

FIELD OF THE INVENTION

The present invention relates to a tapping circuit for tapping fluid from a main fluid circuit which comprises:

- a hydraulic motor having a preferred operating direction and having a casing which defines an internal space and in which a cylinder block is disposed; and
- at least two main pipes suitable for being put in communication with the cylinder block of the motor and constituting respectively, in the preferred operating direction of said motor a feed main pipe and a discharge main pipe;
- the tapping circuit comprising means for tapping fluid from the main circuit and means for removing the tapped fluid to a pressure-free reservoir via a removal pipe.

The tapping circuit is, in particular, a replenishing circuit which taps fluid from the main circuit for the purposes of cooling it, or a flushing circuit, which taps fluid so as to inject it into the casing of the motor to stabilize the temperature thereof. It can also be a circuit which performs replenishing and flushing in combination.

BACKGROUND OF THE INVENTION

Replenishing circuits are known that use a first replenishing valve constituted by a selector whose first two ports are connected to respective ones of the two main pipes, and whose third port is connected to a removal pipe via a second replenishing valve constituted by a flow-rate regulator. The first valve includes a slide suitable for taking up three stable positions, namely a neutral position in which its three ports are not connected together, so that replenishing is not performed, and two replenishing positions, in which the first port or the second port is connected to the removal pipe. The slide is caused to go between the three positions by the pressure difference existing between the two main pipes. That prior art is shown in FIG. 1 (described below).

Document EP-A-0 896 150 shows a replenishing circuit suitable for flushing the casing of a hydraulic motor. That circuit includes two replenishing valves disposed on respective ones of the two main pipes of the main fluid circuit of the hydraulic motor. Each of those valves is controlled by the fluid pressure in the pipe with which it co-operates to go between a neutral position in which it does not tap any fluid and a flushing position in which it taps fluid from said pipe and injects it into the casing of the motor.

OBJECTS AND SUMMARY OF THE INVENTION

An object of the present invention is to provide a tapping circuit that is simplified compared with the above-mentioned prior art.

This object is achieved by the fact that the tapping circuit of the invention further comprises a single tapping and removal valve connected continuously via a tapping pipe to a single one of said main pipes, the valve also being connected to the removal pipe, and by the fact that the main pipe to which the tapping and removal valve is connected is the main pipe that constitutes the discharge pipe in the preferred operating direction of the motor.

Contrary to the teaching of the prior art, the invention thus proposes to connect the tapping and removal valve to only one of the two main pipes. In the invention, the pipe is chosen appropriately as being the pipe which, in the preferred operating direction of the motor, is the discharge pipe.

The motor is a reversible motor (its rotor can rotate in two opposite directions) which has a preferred operating direction.

For example, it may be a motor serving to drive a vehicle in translation, in which case the preferred operating direction corresponds to the vehicle moving forwards.

It may also be a motor whose preferred operating direction is related to an operating parameter that is intrinsic to the motor, such as its efficiency, which is better in one direction than in the other.

For example, it may be a motor having two operating cubing capacities, of the type described in Patent Applications FR-A-2 588 616 and FR-A-2 780 450. In such a motor, in low cubic capacity mode, the distribution pipes that do not contribute to providing drive torque are connected to the discharge in the preferred operating direction, and they are connected to the feed in the non-preferred direction, in which they present resistive torque.

In the tapping circuit of the invention, a single tapping and removal valve is sufficient, and it is only connected, via a first port, to the tapping pipe, and thus to the main pipe which serves as the discharge pipe in the preferred operating direction of the motor, and, via a second port, to the removal pipe.

The tapping and removal valve of the invention serves very advantageously to perform a replenishing function for the purpose of cooling the fluid when the main circuit is a closed circuit.

Advantageously, the removal pipe is connected continuously to the internal space of the hydraulic motor via an injection segment which is provided in a cover portion of said motor, and the replenishing circuit further comprises a pipe for connection to a pressure-free reservoir connected to the internal space of the motor via a leakage return orifice of said motor.

In this advantageous configuration, the tapping circuit flushes the casing of the motor. The fluid tapped via the tapping and removal valve is injected into the casing via the injection segment, while the fluid present in the casing of the motor is removed therefrom via the usual leakage return orifice. In a closed circuit, it is possible to combine replenishing and flushing by cooling the fluid before re-injecting it into the circuit.

When it serves to flush the motor, and regardless of whether replenishing is also associated with the flushing, the tapping and removal valve is advantageously contained in a cartridge suitable for being mounted on said cover portion by being connected to said injection segment.

Thus, with a standard “motor body”, it is possible, merely by changing the cartridge in which the tapping and removal valve is mounted, to choose the flushing mode best suited to the use in question.

Advantageously, the tapping and removal valve has a communication passageway between the tapping pipe and the removal pipe, and it includes means for causing the cross-sectional area of said passageway to vary as a function of the pressure difference between the tapping pipe and the removal pipe.

When the tapping (replenishing and/or flushing) is active, the tapping pipe and the removal pipe are interconnected via this communication passageway. Its cross-sectional area is variable so that the flow rate of tapped fluid is adapted to suit the operating conditions of the motor. Insofar as, in the invention, a single tapping and removal valve is sufficient to perform the replenishing function and/or the flushing function, it is easy, for any given use, to choose the most suitable valve by the shape of its communication passageway, and by the way in which the cross-sectional area of said passageway varies.

In which case, advantageously, the tapping and removal valve comprises a flow-rate regulator having at least one inlet suitable for communicating with the tapping pipe, an outlet suitable for communicating with the removal pipe, a constriction interposed between said inlet and said outlet, and means for causing the cross-sectional area of the passageway between the inlet and the outlet to vary in relation with the head loss through said constriction.

This configuration, which is simple and effective, makes it possible to cause the flow rate of tapped fluid (used for replenishing and/or for flushing) to vary as a function of the pressure difference between the tapping pipe and the removal pipe.

In a first advantageous variant, the tapping and removal valve has means for opening the communication passageway only when the pressure difference between the tapping pipe and the removal pipe is at least equal to a threshold value.

When the pressure difference between the tapping pipe and the removal pipe is relatively small, and less than the threshold value, fluid is not tapped so as not to consume, for this auxiliary function, fluid that is then necessary in some other portion of the circuit, e.g. for releasing the parking brake of the motor, when starting up the motor.

In another advantageous variant, the tapping and removal valve has means for opening the communication passageway only when the pressure difference between the tapping pipe and the removal pipe is greater than a threshold value and when said pressure difference is less than a limit value.

In which case, fluid is not tapped for replenishing and/or flushing not only in the above-mentioned situation of low pressure (e.g. on starting up the motor), but also in a situation in which the pressure in the tapping pipe is high. It is thus possible to avoid tapping a flow rate which would cause a loss of power.

In addition, the temperature of the fluid increases when the flow rate is high. Therefore, said limit value is preferably chosen so that, as a function of the flowrate/pressure curve of the motor, it corresponds to a flow-rate value that is less than the flow rate for which the temperature of the fluid is considered to be too high for it to be possible for the fluid to serve to flush the casing of the motor. Thus, flushing is not performed when conditions are not satisfactory.

In addition, when the motor is used in its non-preferred direction of rotation only in short situations, such as for reversing, fluid is not tapped because the pressure in the tapping pipe which, in said non-preferred direction, is connected to the feed main pipe, is momentarily high.

Advantageously, the above-mentioned threshold value is about 15 bars, while the limit value is about 25 bars. For example, the communication passageway is such that, when the pressure difference between the tapping pipe and the removal pipe is greater than the threshold value and, optionally, less than the limit value, the tapped flow rate is 6 liters per minute (l/min). For example, this is applicable for a circuit in which the maximum pressure is about 400 bars, and the maximum flow rate is about 100 l/min.

BRIEF DESCRIPTION OF THE DRAWINGS

The invention will be well understood, and its advantages will appear more clearly on reading the following detailed description of an embodiment shown by way of advantageous example. The description refers to the accompanying drawings, in which.

MORE DETAILED DESCRIPTION

Figure 1:
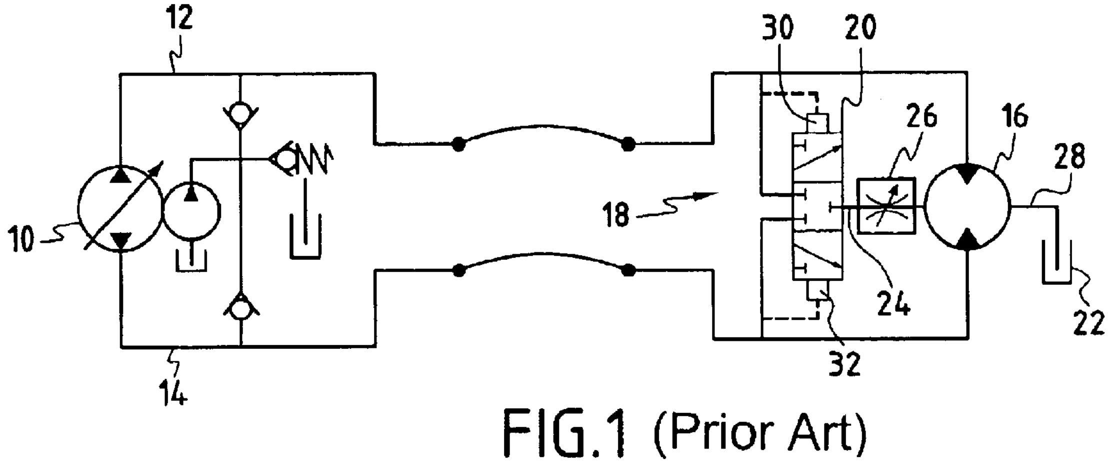
FIG.1 (Prior Art)
FIG. 1 shows a replenishing circuit of the prior art.

FIG. 1 shows a closed circuit whose main pump 10 has its orifices connected to respective ones of two main pipes 12 and 14 respectively serving as a feed pipe and as a discharge pipe for a hydraulic motor 16 to which they are connected.

In this circuit, a replenishing circuit 18 includes a first replenishing valve 20 constituted by a selector which has two inlet ports connected to respective ones of the two main pipes 12 and 14, and one outlet port which, via a removal pipe, removes the fluid tapped by the valve 20 to a reservoir under atmospheric pressure 22. More precisely, the removal pipe includes a connection segment 24 which is disposed between the outlet of the valve 20 and an orifice which opens out into the casing of the motor 16. A second replenishing valve constituted by a flow-rate regulator 26 is disposed on this segment. Thus, under given operating conditions, the fluid tapped by the first replenishing valve 20 is injected into the casing of the motor. Inside the casing, flushing takes place, and the fluid is removed via a leakage return pipe 28 which constitutes an end segment of the removal pipe. The valve 20 is controlled by control means 30 and 32 so that it is caused to go from its neutral position in which it is shown in FIG. 1, to one or other of its replenishing positions in which it connects the pipe 14 or the pipe 12 (the pipe that is at the lower pressure) to the pipe 24.

Figure 2:
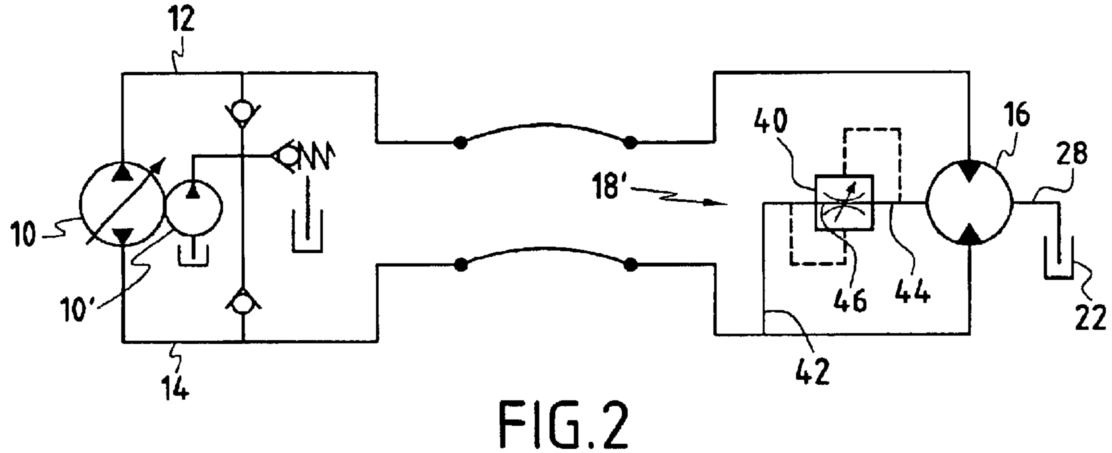
FIG. 2 shows a replenishing circuit of the invention, adapted to a closed circuit.

In FIG. 2, the elements unchanged relative to the elements shown in FIG. 1 have like references. The motor 16 has a preferred operating direction, in which it is the pipe 12 which serves as the feed pipe, while the pipe 14 serves as the discharge pipe. The motor 16 is not shown in detail, but it is preferably a motor having radial pistons, e.g. of the type described in FR-A-2 780 450.

The replenishing circuit 18' includes a single tapping and removal valve 40 which is connected continuously to the discharge pipe 14 via a tapping pipe 42. This valve 40 is also connected to the removal pipe. More precisely, its outlet is connected to an injection pipe 44 which injects the fluid tapped from the pipe 14 via the tapping pipe 42 into the internal space of the casing of the motor 16. The assembly formed by the injection pipe 44 and by the leakage return pipe 28 forms the removal pipe.

The valve 40 serves for replenishing purposes, the fluid that it taps and removes to the reservoir being cooled (by means that are not shown) before it is re-injected into the closed circuit by the booster pump 10'. It is therefore referred to below as the "replenishing valve". In this example, the replenishing valve also serves for flushing the internal space of the casing of the motor, by means of the pipe 42 being connected to said internal space.

The replenishing valve 40 has a communication passageway 46 between the pipes 42 and 44. As indicated in the diagram of FIG. 2, the cross-sectional area of the passageway is variable, the variation in said cross-sectional area being controlled by the pressure difference between the pipes 42 and 44. The valve 40 advantageously constitutes a flow-rate regulator, without it being necessary to interpose an element such as a selector on the replenishing circuit.

To act as a flow-rate regulator, the valve 40 includes a constriction which is disposed in the passageway 46, and the cross-sectional area of the constriction varies as a function of the head loss through it.

The valve 40 of the tapping circuit of FIG. 2 is put in place in a closed main circuit, so as to replenish the fluid flowing in the circuit, and also so as to flush the internal space of the casing of the motor 16.

Figure 3:
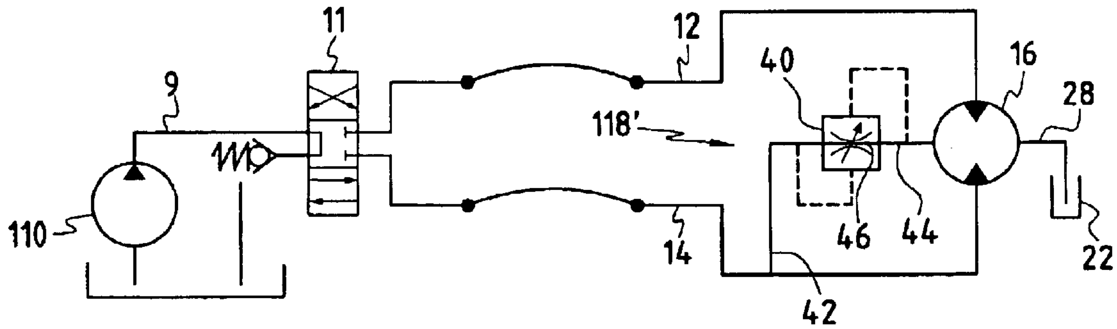
FIG. 3 shows a flushing circuit of the invention, adapted to an open circuit.

In FIG. 3, the tapping circuit 118' in itself is analogous to the circuit 18' of FIG. 2, but it serves only for flushing the internal space of the casing of the motor. The main circuit that includes the main pipes 12 and 14 serving as the feed pipe and as the discharge pipe for the motor 16 is an open circuit in which replenishing is not necessary. It includes a main pump 110 which, via a delivery pipe 9, is connected to a feed selector 11. Depending on the position of this selector, each of the pipes 12 and 14 serves either as the feed pipe or as the discharge pipe.

Thus, in the circuit of FIG. 3, the valve 40 is a flushing valve. The valves 140, 240, 340, and 440 which are described below may be disposed in the circuits of FIG. 2 or 3 in place of said valve 40 in order to perform either replenishing, optionally with flushing of the internal space of the casing of the motor (FIG. 2), or else flushing only (FIG. 3).

Figure 4A:
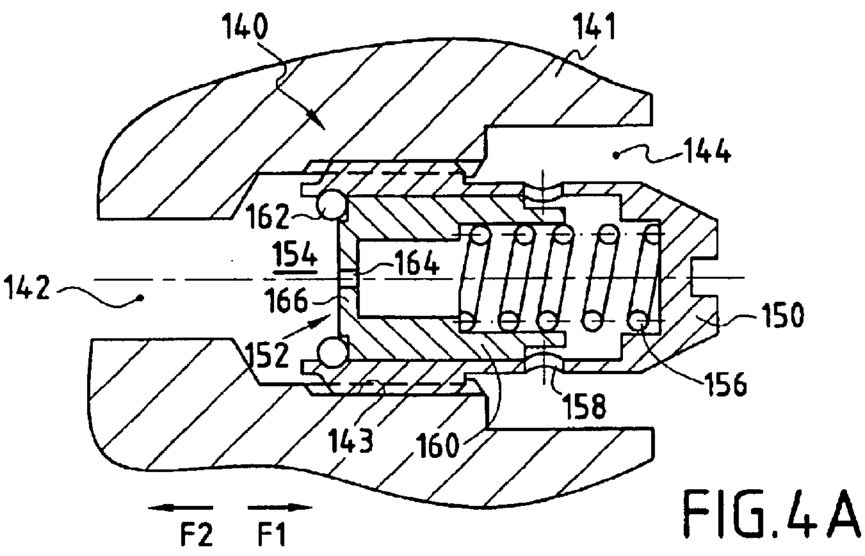
FIG. 4A is an axial section view of a tapping valve of the invention, adapted to replenishing and/or to flushing.

FIG. 4A is an axial section view of a valve 140 that constitutes a first embodiment for the valve 40 of FIGS. 2 and 3. This valve, which forms a flow-rate regulator, is disposed in a support 141 that is provided with a first hole 142 suitable for being connected to the tapping pipe 42 to form the inlet of the valve 140, and with a cavity 144 suitable for being connected to the injection pipe 44 to form the outlet of the valve. For example, the cavity 144 may be the internal space of the casing of the motor 16, when the support 141 is a portion of said casing.

The valve 140 includes a stationary body 150 which is fixed between the hole 142 and the cavity 144 in a bore 143 in the support 141, said hole and said cavity communicating with said bore. The valve includes a slide 152 which is mounted to move in the stationary body 150.

The flow-rate regulator valve 140 includes a hydraulic control chamber 154 which is suitable for being fed with fluid via the tapping pipe (it is connected to the inlet 142 of the valve) so as to urge the slide to move in a first axial displacement direction F1. It also includes resilient return means formed by a spring 156 which is suitable for urging the slide to move in a second displacement direction F2 that is opposite to the first direction.

One of the elements constituted by the body 150 and by the slide 152 has at least one communication orifice, while the other of these elements has a closure wall suitable for masking said orifice as a function of the position of the slide.

In this example, the body 150 is provided with a plurality of communication orifices 158 in its axial wall so as to put the internal space of the body in communication with the cavity 144 which forms the outlet of the valve.

The axial wall of the slide 152 that slides against the wall of the stationary body 150 forms a closure wall 160 which is suitable for masking the orifices 158 when the slide is moved in the direction F1. In this example, the spring 156 continuously urges the slide 152 to return to its first end position, in which it is held in abutment against an abutment ring 162, so that the communication orifice(s) 158 is/are open. The valve 140 has a constriction 164 which forms a communication passageway between the inlet 142 and the outlet 144. More precisely, this constriction 164 is situated in the slide and it forms a passageway between the control chamber 154 and the outlet 144. The slide has a radial wall element 166 which forms the end wall of the control chamber 154 and which is provided with a hole constituting the constriction 164.

Figure 4B:
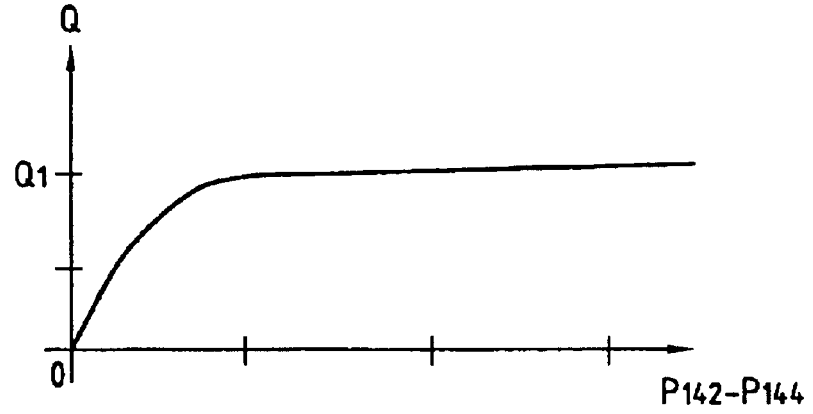
FIG. 4B shows how the flow rate tapped by said valve varies as a function of the pressure difference between its inlet and its outlet.

FIG. 4B shows the curve of the variation of the flow-rate Q of fluid at the outlet 144 as a function of the pressure difference between the inlet and the outlet of the valve 140: $P_{142}-P_{144}$. While the main circuit is being brought up to pressure, resulting in an increase in the pressure in pipe 142, the flow rate increases progressively to reach a regulated value $Q_1$. It then remains stabilized at said value while the pressure continues to increase. The position of the slide 152 whose wall 160 closes off the communication orifice(s) to varying extents depends on the head loss through the constriction 164, which is expressed by the value $P_{142}-P_{144}$. For example, the regulated value $Q_1$ of the flow rate is about 6 liters per minute (l/min).

Figure 5A:
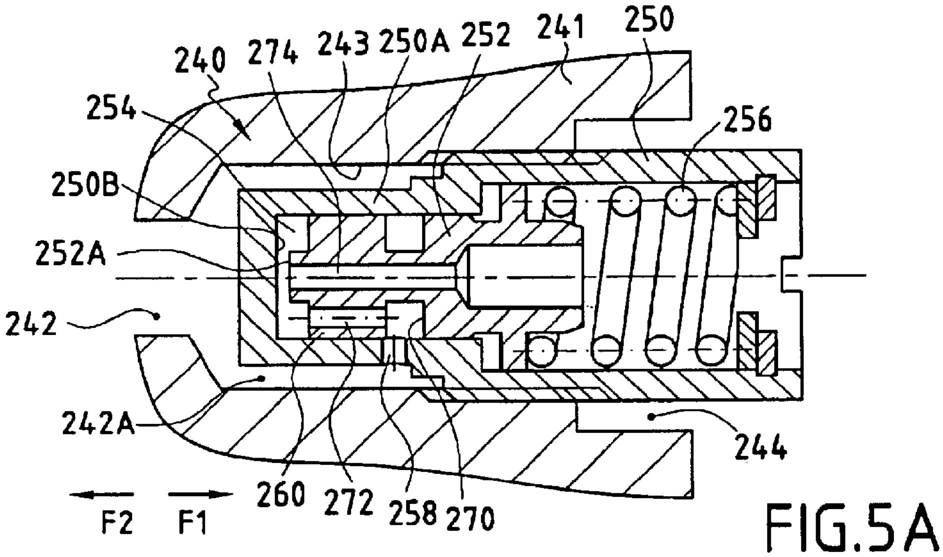
FIGS. 5A and 5B, and FIGS. 6A and 6B are views analogous to those of FIGS. 4A and 4B, for two variant embodiments.

A description follows of FIG. 5A, in which the elements analogous to those of FIG. 4A are given like references plus 100. The body 250 in which the slide 252 is slidably received is fixed in a bore 243 of the support 241 (e.g. the casing of the motor) which communicates with the inlet 242 and with the outlet 244 of the flow-rate regulator valve 240.

As in the variant shown in FIG. 4A, one or more communication orifices 258 are provided in the stationary body 250 and they are masked to varying extents, depending on the position of the slide, by a closure wall 260 that is part of said slide.

More precisely, the body 250 has an axial portion 250A which extends in the bore 243, so that an annular space 242A communicating with the inlet 242 of the valve is provided around said portion 250A. The one or more communication orifices 258 open out in the annular space 242A so that they are continuously in communication with the inlet 242.

The slide 252 is normally urged by the spring 256 to return to its first end position, in which it comes into abutment against an end wall 250B which closes the body 250 at the end closer to the inlet 242. The closure wall 260 extends between the free end 252A of the slide, which end is capable of coming into abutment with the end wall 250B of the body 250, and a groove 270 provided in the periphery of the slide. In the axial portion of the slide that extends between said groove and said end 252A, at least one first link hole 272 is provided.

When the slide is in the first end position, the groove 270 lies in register with the hole(s) 258, so that the inlet 242 of the valve communicates, via the holes 258, via the groove 270, and via the first link hole 272, with a control chamber 254 provided between the end 252A of the slide and the end wall 250B. The slide is provided with a second link hole 274 which passes through it over its entire length. This hole 274 opens out in a portion of the end 252A of the slide relative to which the end of the first hole 272 is set back. Thus, when the slide is in the first end position, the second hole 274 is closed off by the slide coming into abutment against the end wall 250B, while the first hole 272 is not closed off. At the end opposite from the end wall 250B, the second link hole 274 communicates continuously with the outlet 244 of the flow-rate regulator valve 240.

Figure 5B:
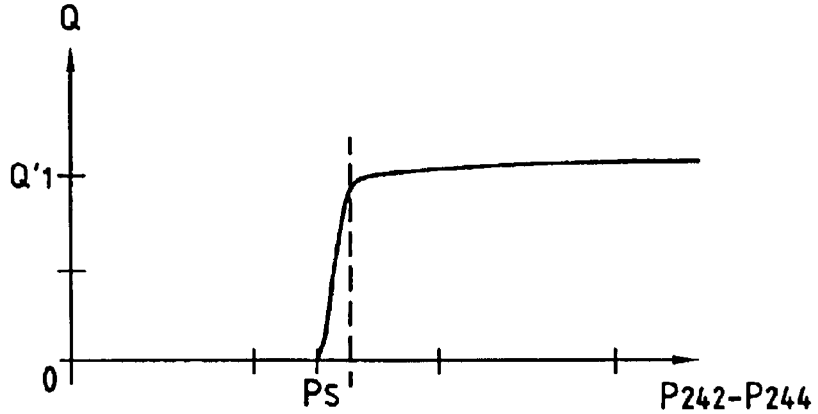

FIG. 5B shows the variation of the flow-rate Q at the outlet of the valve as a function of the pressure difference between its inlet and its outlet: $P_{242}$–$P_{244}$. The spring 256 is calibrated such that, so long as said pressure difference remains lower than a given threshold value $P_S$, the link hole 274 remains closed off, so that the flow rate of the fluid at the outlet is zero. When the threshold value $P_S$ is reached, the slide moves rapidly in the direction F1, so that the flow rate increases rapidly until it stabilizes at a value $Q'_1$.

When the pressure difference $P_{242}$–$P_{244}$ has reached said threshold value, the valve 240 operates analogously to the valve 140, i.e. the closure wall 260 masks the communication orifice(s) 258 to a varying extent so as to obtain a flow rate that is substantially constant between the inlet and the outlet.

The link hole 274 is calibrated to constitute a constriction causing head loss between the inlet 242 and the outlet 244 of the valve 240, and more precisely between the chamber 254 and the outlet 244.

In this variant shown in FIG. 5A, the communication passageway comprises the space 242A, the orifice(s) 258, the groove 270, and the link holes 272 and 274. By extension, the "cross-sectional area" of the communication passageway at any given time is to be understood as being defined by the sum of the cross-sectional areas of the orifices 258 and by the link holes 272 and 274 that together determine the head loss between the inlet and the outlet of the valve. Thus, when the slide is in the first end position, the cross-sectional area of the communication passageway is zero because the link hole 274 is closed off. When the pressure difference between the inlet and the outlet has reached the threshold value $P_S$, the communication passageway is determined by the constriction formed by the hole 274, and by the cross-sectional area of the closable hole(s) 258 left unmasked by the wall 260.

Figure 6A:
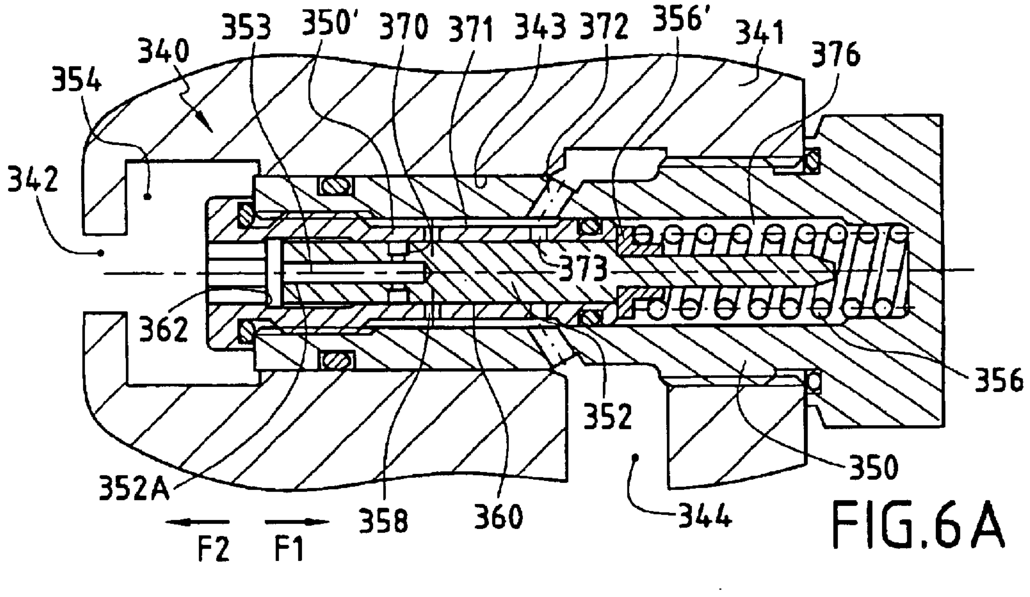

A description follows of FIG. 6A, in which the elements analogous to those of FIG. 4A are given like references plus 200. The valve 340 is disposed in a bore 343 provided in a valve support 241 (e.g. the casing of the motor) and communicating with the inlet 342 and with the outlet 344. The valve comprises an outer stationary body 350 which is fixed in the bore 343, and an inner stationary body 350' which is fixed in the outer stationary body 350. It further comprises a slide 352 which is mounted to move inside the inner valve body 350'. By means of a spring 356 which co-operates with a shoulder 356' on the slide, said slide is continuously urged to return to its first end position, in which its end 352A is in abutment against an abutment shoulder 362 integral with the inner stationary body.

The slide has a blind axial hole 353 which opens out at its end 352A. Radial holes 370 which are calibrated so as to form constrictions connect said blind hole to the outside periphery of the slide.

The inner stationary body 350' has one or more communication orifices 358 which are provided in its axial wall. Depending on the position of the slide 352 inside the stationary body, the one or more orifices are closed off by the axial wall 360 of the slide, or else they are put in communication with the radial holes 370.

On the outside periphery of the inner stationary body 350', the communication orifices 358 open out in an annular space 371 provided between said outside periphery and the inside periphery of the outer stationary body 350. The outer stationary body has one or more link channels 372 which connect the annular space 371 to the outlet 344 of the valve. The space provided inside the bore 343 and in the region of the end of the inner stationary body 350' in which the end 352A of the slide is located, constitutes a hydraulic control chamber 354 in communication with the inlet 342 of the valve.

Figure 6B:
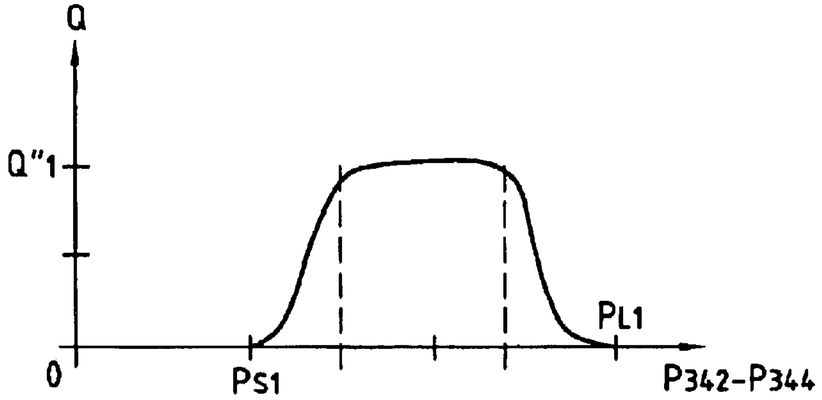

Operation of the valve can be better understood with reference to FIG. 6B which shows the variation of the flow rate at the outlet 344 of the valve as a function of the pressure difference between its inlet and its outlet: $P_{342}$–$P_{344}$.

In the first end position shown in FIG. 6A, the holes 370 do not communicate with the holes 358. Therefore, the fluid cannot flow from the inlet 342 to the outlet 344 of the valve. The spring 356 is calibrated such that, as from a threshold value $P_{S1}$ for the pressure difference $P_{342}$–$P_{344}$, the holes 370 come into register with the orifices 358. In which case, the fluid flows from the inlet 342 through the holes 370 and through the orifices 358 into the annular space 371 and out through the outlet 344 via the link channels 372.

As a function of the calibration and prestress conditions of the spring 356, the flow rate increases at various speeds from the first pressure threshold value to reach a stabilized value $Q''_1$. The extent to which the holes 370 are in register with the orifices 358 is dependent on the calibration of the spring, and said calibration and the cross-sectional area of the constrictions formed in the holes 370 are such that the flow rate remains stabilized at said value $Q''_1$, while the pressure difference $P_{342}$–$P_{344}$ remains within the range defined from the threshold value $P_{S1}$ to a limit value $P_{L1}$.

However, the communication orifice(s) 358 is/are of length, as measured in the direction of displacement F1 of the slide 352, that is less than the stroke of said slide. Thus, when the pressure difference becomes higher than the value $P_{L1}$, the displacement of the slide in the direction F1 is such that the holes 370 cease to be in register with the communication orifice(s) 358 which is/are masked again by the axial wall 360 of the slide. Thus, the flow rate becomes zero at the outlet again.

In other words, in the variant shown in FIG. 6A, the communication orifice(s) 358 is/are closed when the slide is in the two end positions by the closure wall constituted by the axial wall 360 of the slide.

The spring 356 is disposed in a chamber 376 provided in the outer stationary body 350 at that end of the inner stationary body 350' which is opposite from the inlet 342 of the valve. This chamber 376 may constitute a hydraulic damping chamber for damping the displacement of the slide.

The inner stationary body has one or more secondary communication holes 373 which open out, on the outside periphery of the inner body 350', into the annular space 371 and, in the bore of the inner body 350', into a region of said bore in which the outside periphery of the slide 352 does not co-operate in leaktight manner with the inner body 350'. Thus, via the secondary communication holes 373, the fluid contained in the annular space 371 can feed the hydraulic damping chamber 376 in which the spring 356 is disposed.

For example, a sealing gasket (not shown) is disposed in the axial portion of the body 350' that is situated between the communication orifices 358 and the secondary communication holes 373, while operating clearance is provided between the slide and the inner stationary body 350' in the vicinity of the shoulder 356'.

The chamber 376 thus communicates with the annular space 371 via a constriction (the above-mentioned clearance). Thus, both in the direction in which it empties, and in the direction it which it is fed, it damps the displacement of the slide 352.

In the replenishing active configuration of the valve, its inlet and its outlet communicate via the communication passageway formed by the blind hole 353, by the orifices having the constrictions 370, by the communication orifice(s) 358, by the annular space 371, and by the link holes 372. To enable the slide to move far enough in the direction F1 for the communication between the holes 370 and the orifices 358 to cease, it is necessary for the chamber 376 to be emptied of the fluid that it contains. The emptying cross-sectional area is determined by the clearance between the slide and the bore in the inner body 350', so that emptying takes place slowly. In other words, the chamber 376 makes it possible to slow down the displacement of the slide in the direction F1 so as to prolong the replenishing active configuration of the valve until the pressure difference between the inlet and the outlet of said valve reaches the value $P_{L1}$.

A description follows of a variant tapping and removal valve that can serve for replenishing and/or flushing, and that is adapted to perform an auxiliary function in association with at least one other valve.

Figure 7:
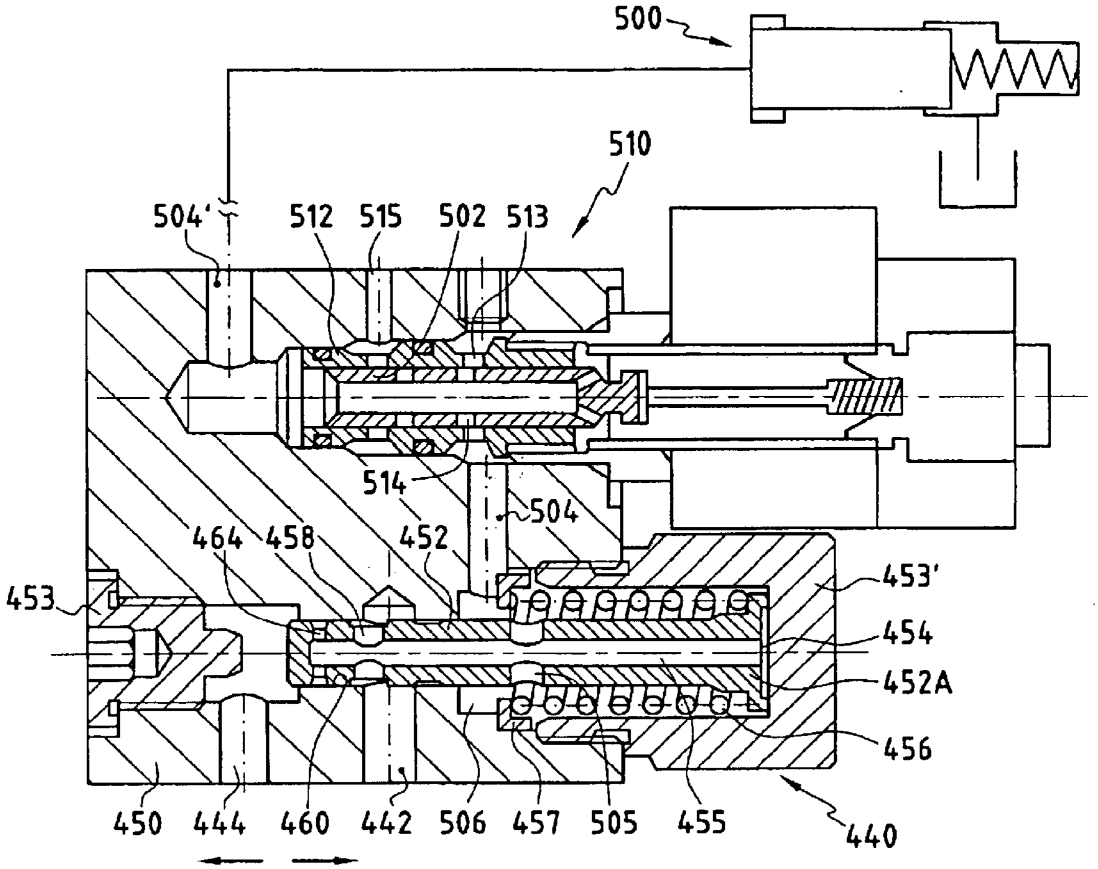
FIG. 7 is an axial section view of a tapping valve adapted to replenishing and/or flushing in a variant that is controlled by a solenoid valve.

In FIG. 7, the slide 452 is mounted to move in a bore of the valve body 450, which bore is continuously connected to the inlet 442 and to the outlet 444 of the flow-rate regulator valve. The bore in the valve body 450 in which the slide is disposed is closed at both of its ends, by respective first and second stoppers 453 and 453'. A spring 456 co-operates at one end with the slide 452 and at the other end with an abutment member 457 secured to or integral with the stationary body.

A hydraulic control chamber 454 is disposed between the end 452A of the slide and the stopper 453'. The slide has one or more communication orifices 458 disposed radially between its outside periphery and a blind axial hole 455 which opens out in the hydraulic control chamber 454. The slide also has calibrated communication orifices 464 which connect the blind axial hole 455 to its outside periphery, and which extend between the orifice 458 and that end of the slide which is opposite from the control chamber 454.

When the slide 452 is in a first end position as shown in FIG. 7, the calibrated holes 464 do not communicate with the outlet 444 of the valve. To make this communication possible, the slide must move sufficiently in the direction F1 against the return force of the spring 456.

The curve giving the variation of the flow rate at the outlet of the valve as a function of the pressure difference between its inlet and its outlet is of the same type as the curve shown in FIG. 5B. When, due to the chamber 454 being fed with fluid, the slide has moved sufficiently in the direction F1, then the fluid flows from the inlet to the outlet via the communication passageway constituted by the communication orifice(s) 458, by the blind axial hole 455, and by the calibrated orifices 464. As from this situation, the orifices 458 are masked to varying extents by the wall of the bore of the body in which the slide moves, so that, also as a function of the prestresses of the spring 456, the flow rate is stabilized at a given value. Thus, the valve 440 of FIG. 7 is a low-threshold valve, in which the flow rate at its outlet becomes established only once the pressure difference between its inlet and its outlet has reached a threshold value.

FIG. 7 shows a set of valves which, in addition to the tapping and removal valve 440, includes an auxiliary receiver 500, for example a selector for selecting the cubic capacity of the motor 16, and a solenoid valve 510 controlling the receiver. The solenoid valve comprises a stationary body 512 disposed in a bore in the stationary body 450 and a slide 502 disposed in the body 512. The inlet of the receiver 500 is connected to an auxiliary outlet of the tapping and removal valve 440. More precisely, the blind axial hole 455 of the slide 452 communicates continuously with an auxiliary outlet chamber 506 via a transverse communication channel 505, the outlet chamber feeding the duct 504 which, when the slide 502 of the solenoid valve is displaced so that its holes 514 communicate with said duct via holes 513 in the body 512, enables the receiver 500 to be fed via the inlet 504' of said solenoid valve.

It should be noted that the feeding of the auxiliary outlet chamber 506 with fluid depends on the communication cross-sectional area between the communication orifices 458 and the inlet 442 of the valve 440. Thus, the valve 440 serves as a pressure regulator for the feeding of the receiver 500 with fluid via the solenoid valve 510.

Figure 8:
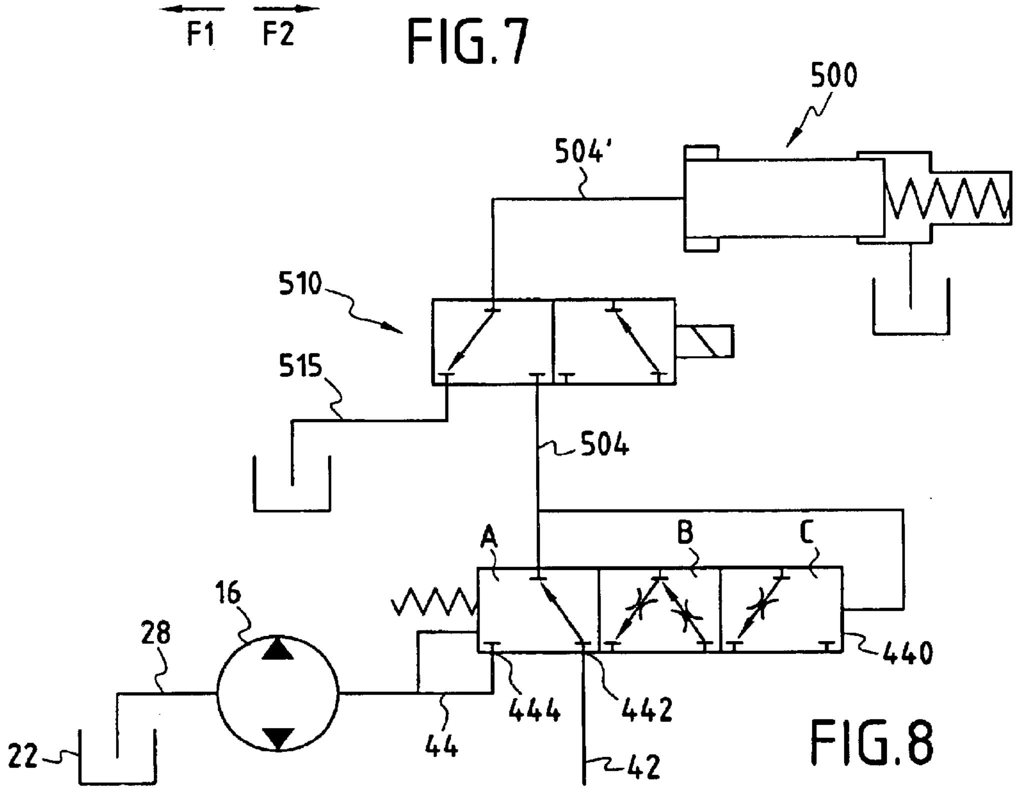
FIG. 8 is a circuit diagram showing a portion of a circuit and encompassing all of the assembly shown in FIG. 7.

FIG. 8 is a diagram showing the valve 440, the receiver 500, and the solenoid valve 510 as integrated in the circuit. The valve 440, fed via the tapping pipe 42 which is connected to its inlet 442, is a replenishing and/or flushing valve which, as a function of the position of its slide, injects the fluid tapped from the main circuit into the injection pipe 44, via its outlet 444, this fluid being injected into the motor 16 in the manner indicated in FIG. 2 or 3.

In its first end position A as shown in FIG. 8, the valve 440 does not yet make it possible to tap the fluid, because the calibrated orifices 464 do not communicate with the outlet 444, but its auxiliary outlet chamber 506 is already fed via the inlet 442.

In its intermediate position B, the valve 440 makes it possible, via the calibrated orifices 464 and via the constrictions formed by the partial masking of the orifices 458, to inject a regulated fluid flow rate into the pipe 44 and into the auxiliary outlet duct 504. If the pressure in said auxiliary outlet duct reaches a limit value, then the valve 440 comes into its position C, in which the communication orifices 458 are masked by the wall 460 of the bore in which the slide is disposed, so that the communication between the inlet 442 and the outlet 444 of the valve 440 ceases. Conversely, the outlet 444 remains connected to the auxiliary outlet duct 504 via the blind axial hole 455 and via the calibrated orifices 464 via which it removes fluid in uniform manner. Since the valve 440 is then fed by the pressure in the duct 504, the position C is unstable. The position A is stable only at low pressure in the pipe 42, while the position B is stable when the pressure in said pipe is greater than the threshold of the valve 440.

As can be seen in FIG. 8, the solenoid valve 510 has first and second ports respectively connected continuously to the auxiliary outlet 504 of the valve 440 and to the inlet 504' of the receiver 500, and a third port connected to a pressure-free reservoir via a duct 515. Depending on its position, the solenoid valve causes its first and its second port or its second and its third port to communicate in pairs. Thus, as a function of the position of the solenoid valve 510, the auxiliary outlet duct 504 of the valve 440 whose pressure is regulated serves to control the receiver 500.

Advantageously, regardless of the variant chosen, the tapping and removal valve of the invention is contained in a cartridge which is suitable for being mounted on a cover portion of the motor. The valve body 150, 250, 350 forms a part that is suitable for being put in place in a recess provided in the casing of the motor (in particular a cover portion), the inlet and the outlet of the valve opening out into said recess.

What is claimed is:

1. A hydraulic circuit including a main fluid circuit which comprises:

a hydraulic motor having a preferred operating direction and having a casing which defines an internal space and in which a cylinder block is disposed, and at least two main pipes suitable for being put in communication with the cylinder block of the motor and constituting respectively, in the preferred operating direction of said motor a feed main pipe and a discharge main pipe;

the hydraulic circuit further comprising a tapping circuit including means for tapping fluid from the main circuit and means for removing the tapped fluid to a reservoir under atmospheric pressure via a removal pipe;

said tapping circuit further comprising a single tapping and removal valve connected continuously via a tapping pipe to a single one of said main pipes, the valve also being connected to the removal pipe, the tapping and removal valve being connected to the discharge main pipe in the preferred operating direction of the motor;

the tapping and removal valve comprising:

a flow-rate regulator that includes a slide mounted to move in a body, a hydraulic control chamber suitable for being fed with fluid via the tapping pipe to urge the slide to move in a first displacement direction; and resilient return means suitable for urging the slide to move in a second displacement direction opposite from said first displacement direction;

wherein one of the elements constituted by the body and by the slide has at least one communication orifice, while the other of said elements has a closure wall suitable for masking said orifice as a function of the position of the slide, a communication passageway between the tapping pipe end the removal pipe being open when said orifice is not masked by said closure wall; and wherein the communication orifice has a length, as measured in the displacement direction of the slide, that is less than the stroke of said slide, said orifice being masked by the closure wall when the slide is in its two end positions so that said communication passageway is opened only when the pressure difference between the tapping pipe and the removal pipe is greater than a threshold value and is less than a limit value.

2. A hydraulic circuit according to claim 1, wherein the tapping and removal valve has means for opening the communication passageway only when the pressure difference between the tapping pipe and the removal pipe is at least equal to the threshold value, wherein the resilient return means urge the slide continuously to return towards a position in which the communication passageway is dosed off, and wherein said means are calibrated so as to allow said passageway to be opened only when the pressure in the control chamber reaches the threshold value.

3. A hydraulic circuit including a main fluid circuit which comprises:

a hydraulic motor having a preferred operating direction and having a casing which defines an internal space and in which a cylinder block is disposed; and at least two main pipes suitable for being put in communication with the cylinder block of the motor and constituting respectively, in the preferred operating direction of said motor a feed mum pipe and a discharge main pipe;

the hydraulic circuit further comprising a tapping circuit including means for tapping fluid from the main fluid circuit and means for removing the tapped fluid to a reservoir under atmospheric pressure via a removal pipe;

said tapping circuit further comprising a single tapping and removal valve connected continuously vie a tapping pipe to a single one of said main pipes, the valve also being connected to the removal pipe, the tapping and removal valve being connected to the discharge main pipe in the preferred operating direction of the motor;

said tapping and removal valve having a communication passageway between the tapping pipe and the removal pipe, said valve including means or causing the cross-sectional area of said passageway to vary continuously as a function of the pressure difference between the lapping pipe and the removal pipe;

wherein the tapping and removal valve has means for opening the communication passageway only when the pressure difference between the tapping pipe end the removal pipe is at least equal to a threshold value.

4. A hydraulic circuit according to claim 3, the tapping and removal valve comprises a flow-rate regulator having at least one inlet suitable for communicating with the tapping pipe, an outlet suitable for communicating with the removal pipe, a constriction interposed between said inlet and said outlet, and means for causing the cross-sectional area of the passageway between the inlet and the outlet to vary in relation with the head loss through said constriction.

5. A hydraulic circuit according to claim 4, wherein the flow-rate regulator comprises a slide mounted to move in a body, a hydraulic control chamber suitable for being fed with fluid via the tapping pipe to urge the slide to move in a first displacement direction, and resilient return means suitable for urging the slide to move in a second displacement direction opposite from said first displacement direction, and wherein one of the elements constituted by the body and by the slide has at least one communication orifice, while the other of said elements has a closure wall suitable for masking said orifice as a function of the position of the slide.

6. A hydraulic circuit according to claim 5, wherein the constrict on is situated in the slide, and it forms a passageway between the hydraulic control chamber and the outlet.

7. A hydraulic circuit according to claim 3, wherein said means for opening the communication passageway are calibrated so as to allow said passageway to be opened only when the pressure in the control chamber reaches the threshold value.

8. A hydraulic circuit according to claim 3, wherein the removal pipe is connected continuously to the internal space of the hydraulic motor via an injection segment which is provided in a cover portion of said motor, and wherein the circuit further comprises a pipe for connection to a reservoir under atmospheric pressure connected to the internal space of the motor via a leakage return orifice of said motor.

9. A hydraulic circuit according to claim 8, wherein the tapping and removal valve is contained in a cartridge suitable for being mounted on said cover portion by being connected to said injection segment.

10. A hydraulic circuit according to claim 3, wherein said means for opening the communication passageway are calibrated so as to allow said passageway to be opened only when the pressure difference between the tapping pipe and the removal pipe is greater than a threshold value and is less than a limit value.

11. A hydraulic circuit according to claim 10, wherein said means for opening the communication passageway comprising the communication orifice has a length, as measured in the displacement direction of the slide, that is less than the stroke of said slide, and said orifice being closed by the closure wall when the slide is in its two end positions.

12. A hydraulic circuit according to claim 10, wherein the removal pipe is connected continuously to the internal space of the hydraulic motor via an injection segment which is provided in a cover portion of said motor, and wherein the circuit further comprises a pipe for connection to a reservoir under atmospheric pressure connected to the internal space of the motor via a leakage return orifice of said motor.

13. A hydraulic circuit according to claim 12, wherein the tapping under removal valve is contained in a cartridge suitable for being mounted on said cover portion by being connected to said injection segment.

14. A hydraulic circuit including a main fluid circuit which comprises:

a hydraulic motor having a preferred operating direction and having a casing which defines an internal space and in which a cylinder block is disposed; and at least two main pipes suitable for being put in communication with the cylinder block of the motor and constituting respectively, in the preferred operating direction of said motor a feed main pipe and a discharge main pipe;

the hydraulic circuit further comprising a tapping circuit including means for tapping fluid from the main fluid circuit and means for removing the tapped fluid to a reservoir under atmospheric pressure via a removal pipe;

said tapping circuit further comprising a single tapping and removal valve connected continuously via a tapping pipe to a single one of said main pipes, the valve also being connected to the removal pipe, the tapping and removal valve being connected to the discharge main pipe in the preferred operating direction of the motor;

said tapping and removal valve having a communication passageway between the tapping pipe and the removal pipe, said valve including means for causing the cross-sectional area of said passageway to vary continuously as a function of the pressure difference between the tapping pipe and the removal pipe; and further comprising a receiver which has an inlet connected to an auxiliary outlet of the tapping and removal valve, and which feeds at least one auxiliary circuit with fluid under pressure.

15. A hydraulic circuit according to claim 14, wherein the tapping and removal valve comprises a flow-rate regulator having at least one inlet suitable for communicating with the tapping pipe, an outlet suitable for communicating with the removal pipe, a constriction interposed between said inlet and said outlet, and means for causing the cross-sectional area of the passageway between the inlet and the outlet to vary in relation with the head loss through said constriction.

16. A hydraulic circuit according to claim 15, the flow-rate regulator comprises a slide mounted to move in a body, a hydraulic control chamber suitable for being fed with fluid via the tapping pipe to urge the slide to move in a first displacement direction, and resilient return means suitable for urging the slide to move in a second displacement direction opposite from said first displacement direction, and wherein one of the elements constituted by the body and by the slide has at least one communication orifice, while the other of said elements has a closure wall suitable for masking said orifice as a function of the position of the slide.

17. A hydraulic circuit according to claim 16, wherein the constriction is situated in the slide, and it forms a passageway between the hydraulic control chamber and the outlet.

18. A hydraulic circuit according to claim 14, the removal pipe is connected continuously to the internal space of the hydraulic motor via an injection segment which is provided in a cover portion of said motor, and wherein the circuit further comprises a pipe for connection to a reservoir under atmospheric pressure connected to the internal space of the motor via a leakage return orifice of said motor.

19. A hydraulic circuit according to claim 18, wherein the tapping and removal valve is contained in a cartridge suitable for being mounted on said cover portion by being connected to said injection segment.

20. A hydraulic circuit including a main fluid circuit which comprises:

a hydraulic motor having a preferred operating direction and having a casing which defines an internal space and in which a cylinder block is disposed; and at least two main pipes suitable for being put in communication with the cylinder block of the motor and constituting respectively, in the preferred operating direction of sold motor a feed main pipe and a discharge main pipe;

the hydraulic circuit further comprising a tapping circuit including means for tapping fluid from the main fluid circuit and means for removing the tapped fluid to a reservoir under atmospheric pressure via a removal pipe;

said tapping circuit further comprising a single tapping and removal valve connected continuously via a tapping pipe to a single one of said main pipes, the valve also being connected to the removal pipe, the tapping and removal valve being connected to the discharge main pipe in the preferred operating direction of the motor, said tapping and removal valve having a communication passageway between the tapping pipe and the removal pipe, said valve including means for causing the cross-sectional area of said passageway to vary continuously as a function of the pressure difference between the tapping pipe and the removal pipe;

wherein the main circuit is a dosed circuit, and wherein the tapping and removal valve is a flushing valve, the tapped fluid being removed to be cooled.

21. A hydraulic circuit according to claim 20, wherein the tapping and removal valve comprises a flow-rate regulator having at least one inlet suitable for communicating with the tapping pipe, an outlet suitable for communicating with the removal pipe, a constriction interposed between said inlet and said outlet, and means for causing the cross-sectional area of the passageway between the inlet and the outlet to vary in relation with the head loss through said constriction.

22. A hydraulic circuit according to claim 21, wherein the flow-rate regulator comprises a slide mounted to move in a body, a hydraulic control chamber suitable for being fed with fluid via the tapping pipe to urge the slide to move in a first displacement direction, and resilient return means suitable for urging the slide to move in a second displacement direction opposite from said first displacement direction, and wherein one of the elements constituted by the body and by the slide has at least one communication orifice, while the other of said elements has a closure wall suitable for masking said orifice as a fun ion of the position of the slide.

23. A hydraulic circuit according to claim 22, wherein the constriction is situated in the slide, and it forms a passageway between the hydraulic control chamber and the outlet.

24. A hydraulic circuit according to claim 20, wherein the removal pipe is connected continuously to the internal space of the hydraulic motor via an injection segment which is provided in a cover portion of said motor, and wherein the circuit further comprises a pipe for connection to a reservoir under atmospheric pressure connected to the internal space of the motor via a leakage return orifice of said motor.

25. A hydraulic circuit according to claim 24, wherein the tapping and removal valve is contained in a cartridge suitable for being mounted on said cover portion by being connected to said injection segment.

* * * * *